March 10, 1953  E. E. WEMP  2,630,683
ROTARY HYDROKINETIC COUPLER
Filed Jan. 8, 1949  4 Sheets-Sheet 1

INVENTOR.
Ernest E. Wemp
BY
Barnes, Kisselle, Laughlin & Raisch
ATTORNEYS.

March 10, 1953  E. E. WEMP  2,630,683
ROTARY HYDROKINETIC COUPLER
Filed Jan. 8, 1949  4 Sheets-Sheet 2
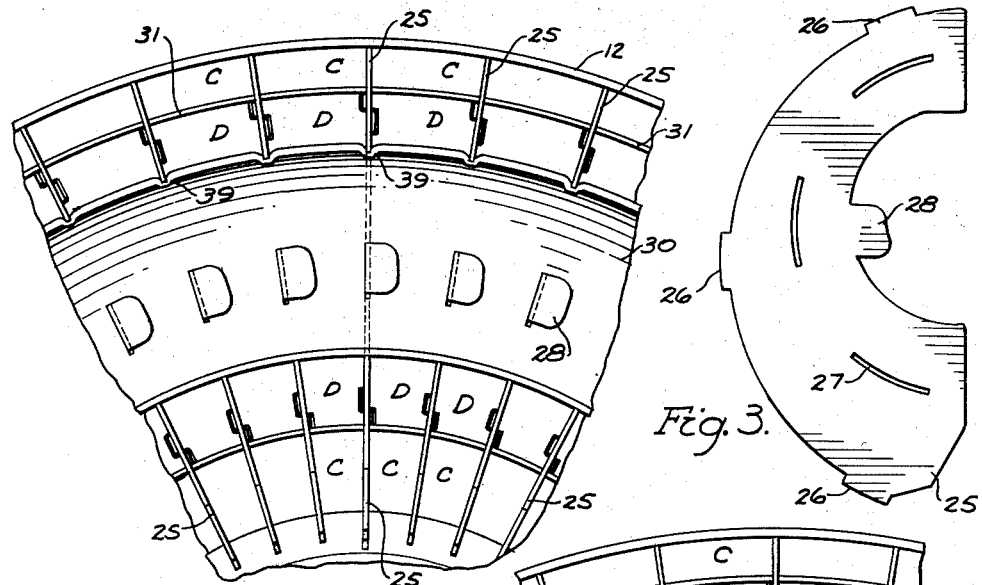
Fig. 2.
Fig. 3.
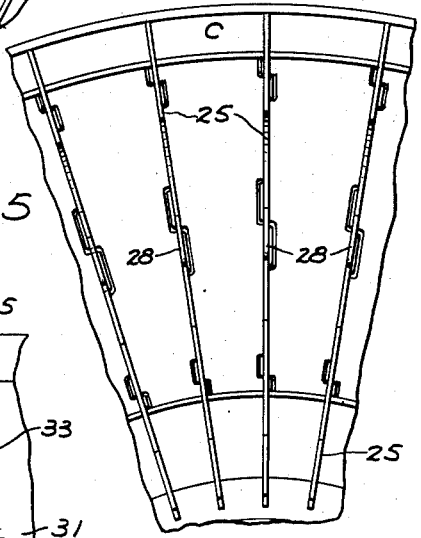
Fig. 5.
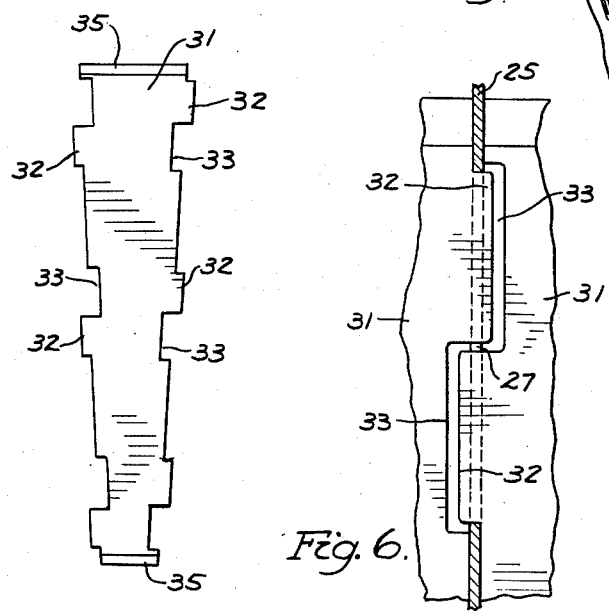
Fig. 4.  Fig. 6.
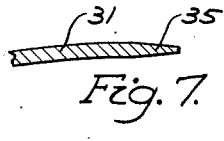
Fig. 7.
INVENTOR.
Ernest E. Wemp
BY Barnes, Kisselle, Laughlin & Raisch
ATTORNEYS.

March 10, 1953 E. E. WEMP 2,630,683
ROTARY HYDROKINETIC COUPLER
Filed Jan. 8, 1949 4 Sheets-Sheet 3

INVENTOR.
Ernest E. Wemp
BY
Barnes, Kisselle, Laughlin & Raisch
ATTORNEYS.

March 10, 1953    E. E. WEMP    2,630,683
ROTARY HYDROKINETIC COUPLER
Filed Jan. 8, 1949    4 Sheets-Sheet 4
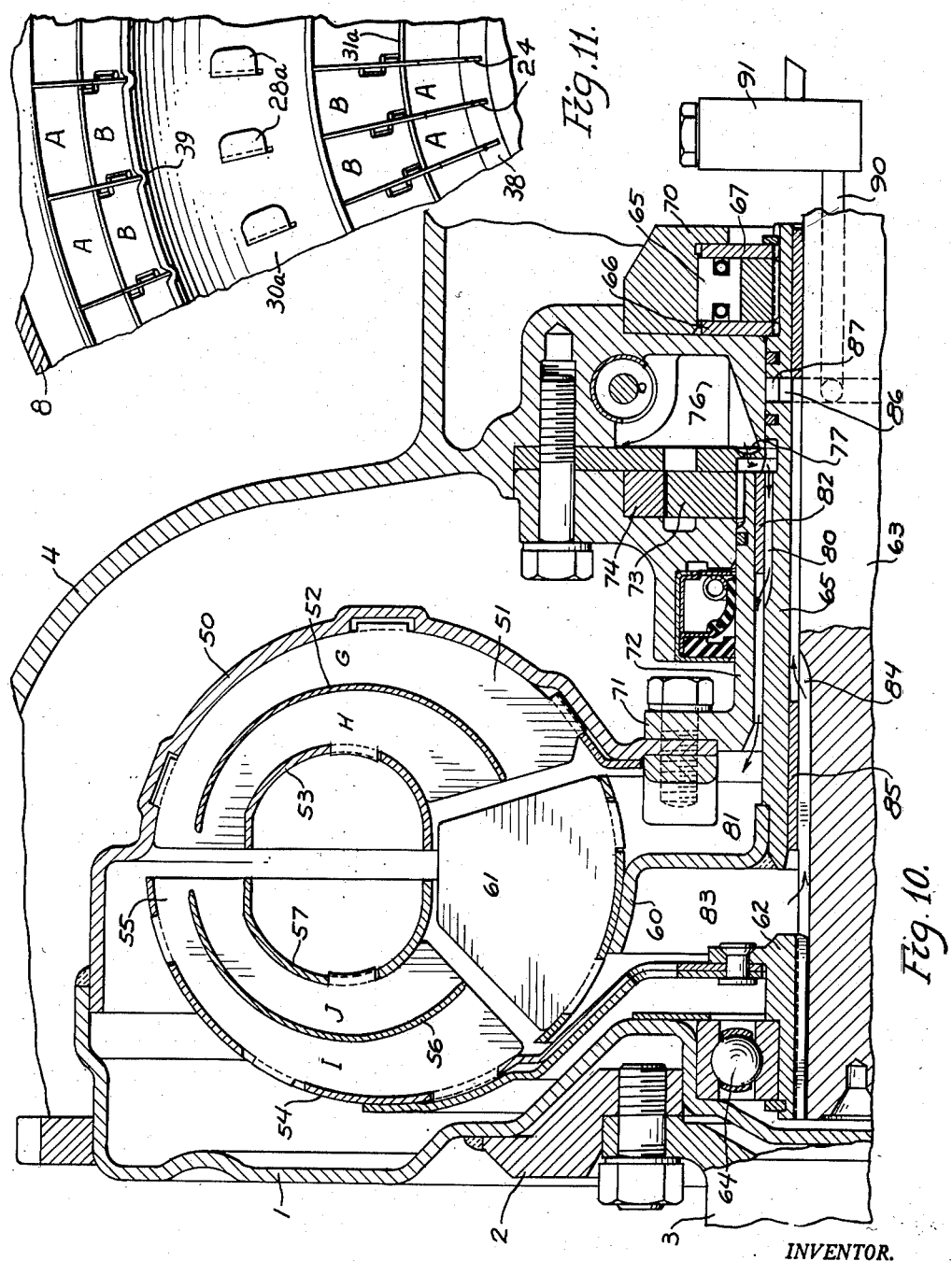
INVENTOR.
Ernest E. Wemp
BY
Barnes, Kisselle, Laughlin & Raisch
ATTORNEYS.

Patented Mar. 10, 1953

2,630,683

UNITED STATES PATENT OFFICE 2,630,683

ROTARY HYDROKINETIC COUPLER

Ernest E. Wemp, Detroit, Mich., assignor of five per cent to Eleanor May Wemp, Los Angeles, Calif., five per cent to Clyde J. Smith, five per cent to Leah Kathleen Smith, and twenty per cent to Lila A. Wemp, all of Detroit, Mich.; William O'Neill Kronner and Lila A. Wemp, executors of said Ernest E. Wemp, deceased Application January 8, 1949, Serial No. 69,904

9 Claims. (Cl. 60—54)

This invention relates to hydro-kinetic couplers and it is concerned particularly with hydrokinetic mechanisms which embody a rotary torus chamber.

The invention is directed to the provision of an improved construction in simple hydro-kinetic couplers which have a driving member or impeller and driven member or rotor and also to hydro-kinetic torque converters which embody a driving member or impeller, a rotor or driven member and in addition thereto, at least one element which is a stator. The general object of the invention is to provide such hydro-kinetic mechanism of improved efficiency.

In such a mechanism a flow of the hydraulic medium in the torus chamber is initiated by speed difference between the impeller and the rotor resulting in what is usually termed slip. This speed difference creates a pressure differential and causes the fluid to flow around the axis of the torus chamber. Inasmuch as the torus chamber itself is rotating, the fluid flows in a spirally circular manner. The purpose of the invention is to provide an improved hydrokinetic construction involving a rotary torus chamber in which the velocity front measured radially across the torus flow path is substantially uniform. This condition will result in a maximum average velocity which will in turn result in maximum torque capacity at any given speed as well as the transmission of maximum horsepower at that speed. In hydro-kinetic mechanisms of the torque converted type, the invention minimizes interference of shock particularly where the liquid enters and leaves the flow path passages of the elements constituting the torus chamber. These and other objects will be fully appreciated as the following detailed description is considered in conjunction with the accompanying drawings.

Fig. 2 is a view looking substantially on line 2—2 of Fig. 1 showing partition and blade structure.

Fig. 3 is a developed view of a blade as may be used in both the impeller and rotor.

Fig. 4 is a developed view of a partition member.

Fig. 5 is a figure similar to Fig. 2 with some parts removed.

Fig. 6 is an enlarged detailed view showing how the partitions and blades are assembled.

Fig. 7 is a detailed view in section showing one end of a partition member.

Fig. 10 is a view largely in cross section illustrating the invention as applied to hydro-kinetic torque converter.

Fig. 11 is a view taken substantially on line 2—2 of Fig. 1 and looking in the opposite direction from the arrows, showing the partition and blade structure of the impeller.

Figure 1:
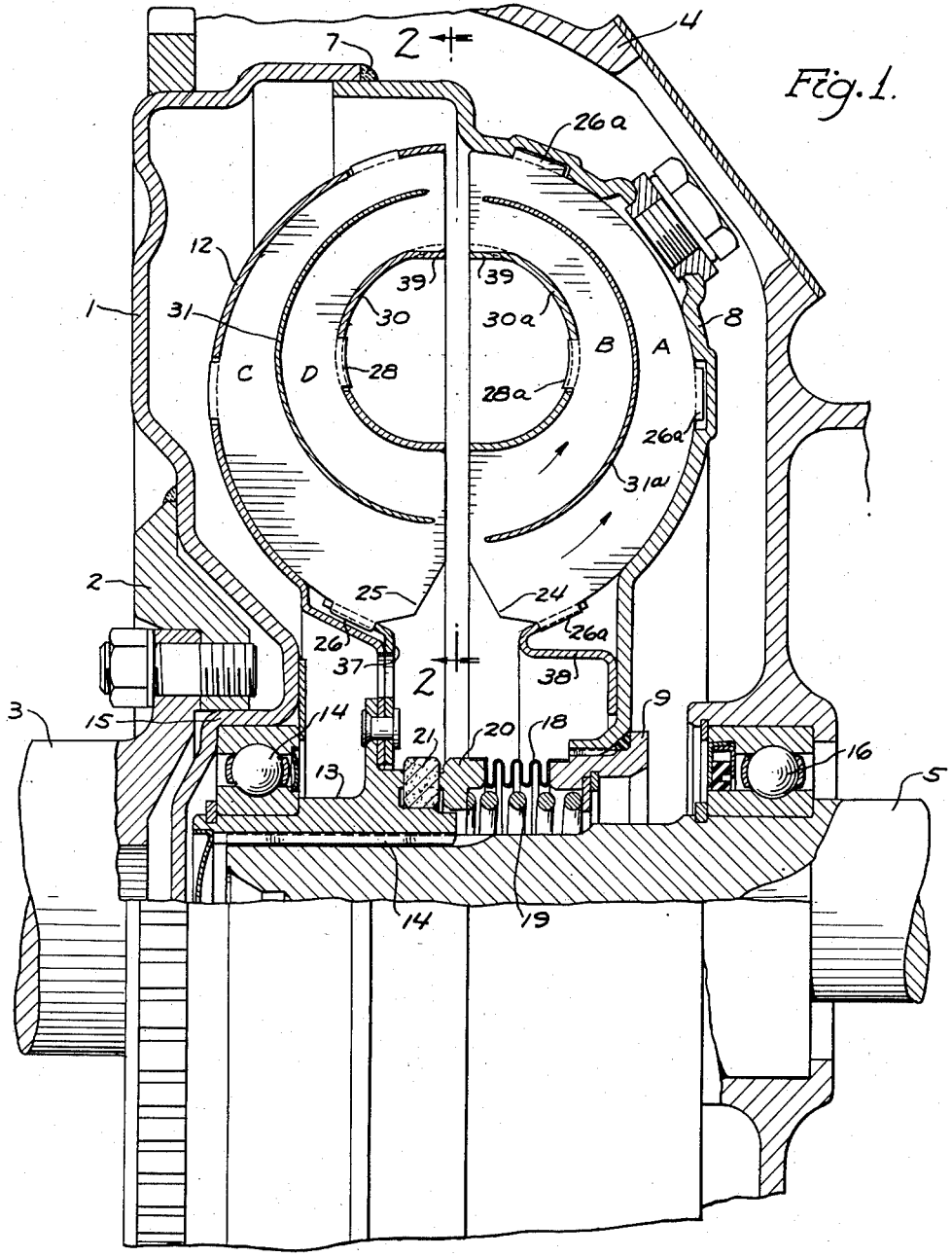
Fig. 1 is a view partly in cross section and partly cut away showing a hydro-kinetic coupler.

As a matter of convenience, the term coupler or the term hydro-kinetic coupler is used herein generically to cover a simple coupler which has no torque converting properties as well as also covering a hydro-kinetic mechanism which has torque converting properties and which is specifically referred to herein as a hydro-kinetic torque converter. The coupler shown in Fig. 1 comprises a permanently assembled unit which embodies a forward member 1 fashioned from suitable sheet metal and welded to a hub 2 which is secured, as shown, to the crankshaft 3 of an engine. The coupler is disposed within a suitable housing 4 secured to or constituting part of the engine. A power output shaft or driven shaft is shown at 5.

The impeller or driving member is welded to the forward member 1 as at 7 and it has a portion or wall 8 shaped to form part of the torus chamber. This member is provided with a hub 9.

The runner, sometimes referred to herein as the rotor, has an outer wall 12 secured to a hub 13 splined or otherwise keyed to the shaft 5 as at 14. The hub 13 is piloted by a bearing 14 positioned in a recess formation 15 of the forward member 1 and it is journalled in a bearing 16 supported in the housing. There is a seal between the hubs 9 and 13 comprising a bellows 18 secured at one end to the hub 9, expanded by a coil spring 19 and having an end member 20 which engages a suitable ring, such as a ring of carbon material 21 which in turn abuts a flange on the hub 13.

The impeller and the rotor are provided with like blades 24 and 25. As shown in Fig. 3 the blade 25 is shaped to fit within the wall member 12 with projecting lugs 26 for extending into apertures in the wall 12 as shown, and with slots 27 therein and a tongue 28. A core 30 is received in the hollow portion of the blade and the tongue 28 passes through an aperture in the core and may be fashioned over as shown in Fig. 2. As illustrated in Fig. 2, there are the series of blades 25 each positioned as described, with the core 30 fitting into the blades as shown. Positioned between each two blades is a partition member 31 formed as shown in Fig. 4. These partitions are all of the same structure and each has wings 32 thereon with adjoining recesses 33. The recesses on one edge of a partition are positioned opposite the wings 32 on the opposite edge so that when the partitions are assembled, a wing 32 on one partition passes through an opening 27 in a blade (Fig. 5) and into a recess 33 in a partition on the opposite side of the blade, while the wing 32 on one partition passes through an opening 27 in a blade (Fig. 5) and into a recess 33 in a partition on the opposite side of the blade, while the wing 32 on said opposite partition projects through the same aperture 27 of the blade and into the recess 33 of the first mentioned partition. Thus when all of the blades and partitions and core are assembled in the curved portion 12 of the runner, the parts are held assembled. Ends of the partitions may be beveled as shown at 35. The blades 24 of the impeller are of the same construction as above mentioned having lugs or projections 26a for fitting into recesses formed in the wall 8 and having wings 28a for holding a core 30a, while positioned between the blades are the partitions 31a. The radially inward parts of the blades may be supported by elements 37 and 38 as shown in Fig. 1. The core portions may be depressed as at 39 in both the impeller and the runner to provide locating seats for the blades.

Now, while the structure of the blades and partitions may be the same as above described, the partitions in the impeller and the runner are offset relative to each other in a diametral manner and, of course, the apertures or slots 27 in the blades will be varied to effect this arrangement. The flow path between each two blades in the impeller is divided by a partition into an outer passage A and an inner passage B, while the flow path between each two blades in the rotor is divided by the partition 31 into an outer passage C and an inner passage D. The direction of flow in the torus chamber as shown in Fig. 1 is counterclockwise as indicated by the arrows.

In such a hydro-kinetic coupler which depends upon torus flow of the fluid for both torque capacity and horsepower, the average velocity of the torus flow is of great importance. It can be shown mathematically that the torque capacity of such a coupler, as well as horsepower transmitted or required to drive it, varies respectively as some exponential function of the average torus velocity. It is believed that the optimum condition will obtain when the velocity front, as measured across the torus flow path radially, is substantially uniform. This condition will result in a maximum average velocity which in turn will result in maximum torque capacity at any given speed as well as the transmission of maximum horsepower at that speed. The diametral offset arrangement of the partitions tends to equalize the velocity front of torus flow.

In order to more clearly bring out the point, it may be well to review the action of torus flow. The flow is initiated by a speed difference between the impeller and the runner. This speed difference or slip creates a pressure difference between the inlet and outlet of the passages A and B of the impeller and the outlet and the inlet of the passages C and D of the rotor. It is this pressure difference measured in pressure head which causes the velocity of torus flow in accordance with the familiar hydraulic law $$h = \frac{v^2}{2g}$$

The path of torus flow is spirally circular determined by the combined rotation of the fluid about the axis of the mechanism and rotation of the fluid about the torus axis. This latter motion, that is rotation of fluid about the torus axis normally results in a maximum velocity of the fluid adjacent the outer defining walls of the torus chamber and a gradually diminished velocity radially across the flow of path, the velocity reaching a minimum value adjacent a real or virtual core as the case may be. This condition is not conducive to a maximum average velocity of torus flow which is the condition for maximum efficiency.

However, the arrangement of the partitions is such that some of the relatively high velocity fluid near the outer defining walls of the torus chamber is diverted and directed toward the core to thereby tend to equalize the velocity flow across the entire torus flow path. The end of the partition 31 at the inlet of passages C and D is positioned radially outwardly from the end of the partition 31a at the outlet of passages A and B. The partition 31, therefore, will engage some of the liquid issuing from the outlet of passage A and crowd or urge the same towards the core and into the passage D. Similarly, the end of the partition 31a at the inlet to passages A and B is radially inward from the adjacent end of the partition 31 and the partition 31a will take some of the liquid issuing from the outlet of passage C and urge it into the passage B. Moreover, the passage A gradually increases in cross sectional area from its inlet to its outlet thus contributing to the deceleration of the flow while passage B gradually decreases in cross section from its inlet to its outlet thus tending to accelerate the flow. Likewise, passage C increases in cross sectional area from its inlet to its outlet while passage D may decrease in cross sectional area from its inlet to its outlet. The extent of the diametral offset may vary with conditions to obtain the desired results and in brief, a portion of the fluid in the outer regions of the flow path of the impeller is directed toward the inner flow path of the runner and a portion of the fluid in the outer flow path of the runner is diverted to the inner flow path of the impeller. The optimum condition is when the velocity front across the entire flow path is substantially uniform thereby attaining maximum average of velocity of torus flow.

Figures 8, 9:
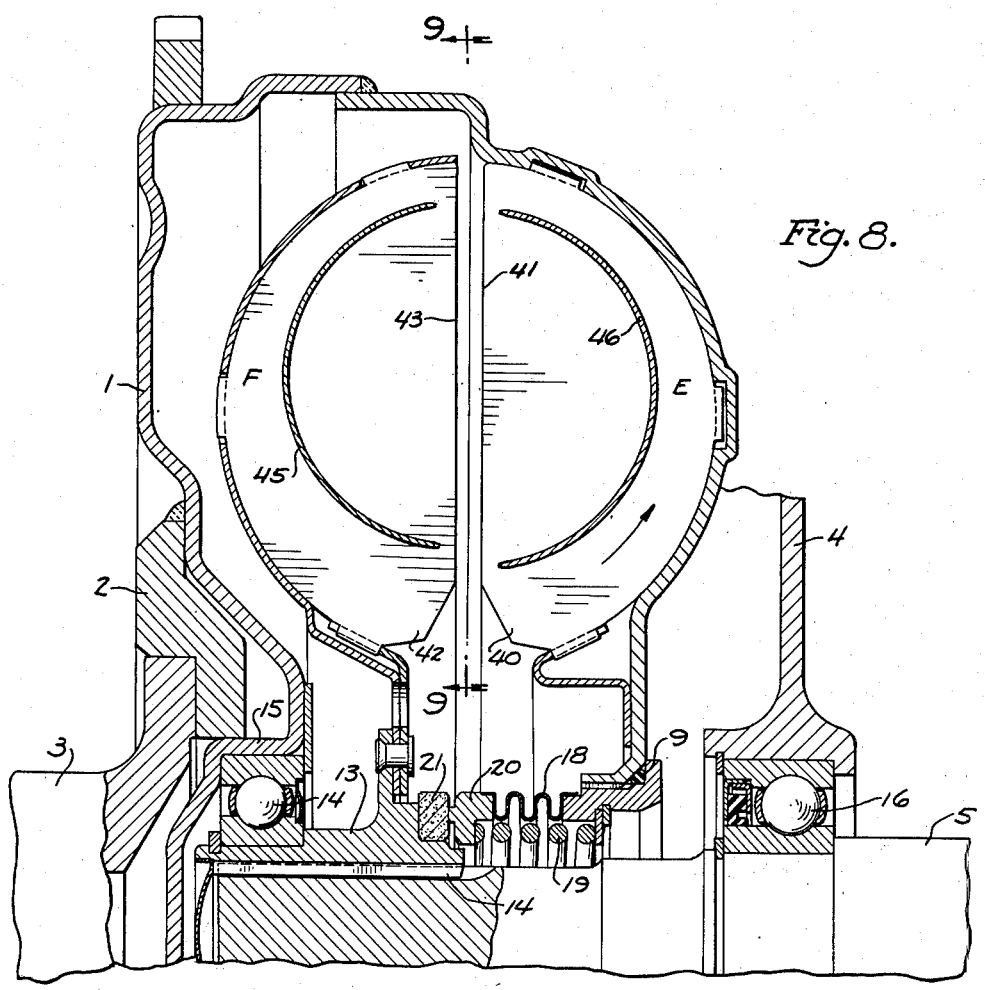
Fig. 8 is a view of a hydro-kinetic coupler of a different form.
Fig. 9 is a view taken substantially on line 9—9 of Fig. 8 showing blade and partition structure.

In the form shown in Figs. 8 and 9, many of the parts of the torus chamber and associated structure are the same as those shown in Fig. 1 and they bear the same reference characters. This form of torus chamber has no core. The blades of the impeller are illustrated at 40 and their inner edge 41 may be straight and in close proximity to the inner edge 43 of the blades 42 of the runner. The blades are arranged radially as shown in Fig. 9 and the partitions in the runner are illustrated at 45, the same being similar to the partitions shown in Fig. 4. The partition 46 of the impeller are similar to the partitions 45. Partitions 45 and 46 are offset in a diametral manner as indicated, thus forming outer flow passages E and F in the impeller and runner respectively.

There is no structurally defined inner flow passage in this form where no core is provided, but the liquid, in flowing through the torus chamber, forms its own hollow core. Some of the liquid issuing from the outlet of passage E is diverted to the inside of the partition 45. Some of the liquid issuing from the outlet of passage F is diverted to the inside of the partition 46. Thus in this form while there is no actual core, there is a virtual core with fluid flowing along the inside surfaces of the partitions 45 and 46 and in the manner as above described, the velocity front may be made substantially uniform.

In Fig. 10 a hydro-kinetic torque converter is shown. This employs a vaned or bladed reaction element or stator and in this connection the flow equalizing effect has another important function. In the torque converter, the blades are not radial and the entrance and exit angles of the blades of both the impeller and the runner are calculated, at different radii from the center, to provide a minimum of interference or shock at predetermined ratio of runner speed to impeller speed. This is a speed ratio of maximum efficiency. Now, if the velocity front of torus flow can be made substantially uniform over a wide speed range, the losses from interference and/or shock may be substantially reduced and the efficiency of the mechanism thereby raised. The partition structure of the form shown in Fig. 10 can be arranged to obtain a substantially uniform velocity front of torus flow in the torque converter.

In this form the impeller includes a member with a wall 50 provided with blades 51, partitions 52 and a core 53, while the runner is constituted by a member 54 with blades 55, partitions 56 and a core 57. The structure may be the same as that described with reference to Fig. 1, thus forming an outer passage G and an inner passage H in the impeller and an outer passage I and an inner passage J in the runner. The partitions are offset in a diametral manner as above described and function in the manner as above described to obtain a substantially uniform velocity front.

In this torque converter, however, a reaction member or stator is positioned between the impeller and the rotor, the same being shown at 60 with blades 61. The hydraulic medium issuing from the passages I and J impinge upon the blades 61 and then flow from the bladed section into the inlet of passages G and H.

As will be seen the impeller is attached to the engine crankshaft by parts the same as that shown in Fig. 1 and having the same reference characters. The runner has a hub 62 for driving an output shaft 63, the shaft being piloted in a bearing 64. The stator is mounted on a sleeve 65 which extends over the shaft 63 and which is provided on its accessible end with a unidirectional coupling 65 which permits the stator to rotate in one direction only and holds it stationary when the force on the blades 61 tends to rotate the stator in the opposite direction. Thrust washers 66 and 67 are also fastened on the end of the sleeve for providing reaction to thrust on the stator, the washer 66 thrusting against the housing 4 and the washer 65 thrusting against a cap or ring 70 secured to the housing.

The hub 71 of the impeller has a sleeve 72 upon which is mounted a pump member 73 for cooperation with a pump member 74. Hydraulic medium is pumped from the high pressure chamber 76 of the pump through a pressure reducing port 77 and thence through a passage 80 and into the torus chamber through the passage 81 on one side of the member 60. The passage 80 is between the sleeves 65 and 72 and partly in a groove formed in sleeve 65 under a bearing 82. Hydraulic medium is displaced from the torus chamber through passage 83 and passage 84 which lies between the sleeve 65 and the output shaft 63 and a part of which is under a bearing 85 which is fitted onto the shaft 63. The escaping medium may flow through a port 86 in sleeve 65 and thence into a groove in the sleeve as shown at 87 from where it may pass through a line 90 into and through a pressure reducing valve 91. In this way the torus chamber is maintained full of liquid under a pressure as determined by the reducing port 71 and the pressure reducing valve 91. This latter description of the structural features of the torque converter has been made to complete the picture of an operating structure.

I claim:

1. In a hydro-kinetic coupler, a rotary impeller member, a rotary runner member, said members being in closely facing co-axial relationship and cooperating to form at least a portion of a rotary torus chamber for hydraulic liquid and each member having blades so that torque may be transmitted from one member to the other, the impeller member having an outer wall and a core defining a flow path, the runner member having an outer wall and a core defining a flow path, partition means in the flow path of the impeller member dividing the flow path into inner and outer flow passages, partition means in the flow path of the runner member dividing the flow path into inner and outer flow passages, said partitions being so offset relative to each other that the edges of one partition at the inlets and outlets respectively of the flow passages defined thereby are offset radially in the same direction relative to the edges of the other partition at the outlets and inlets respectively of the flow passages defined thereby, so as to direct some of the liquid flowing from a passage defined by one partition in which the velocity flow is relatively high into a passage defined by the other partition in which the velocity flow is relatively low whereby to tend to provide a substantially uniform liquid velocity front across the flow path adjacent the inlets and outlets of the flow passages.

2. In a hydro-kinetic coupler, a rotary impeller member, a rotary runner member, said members being in closely facing co-axial relationship and cooperating to form at least a portion of a rotary torus chamber for hydraulic liquid and each member having blades so that torque may be transmitted from one member to the other, the impeller member having an outer wall and a core defining a flow path, the runner member having an outer wall and a core defining a flow path, partition means in the flow path of the impeller member dividing the flow path into inner and outer flow passages, partition means in the flow path of the runner member dividing the flow path into inner and outer flow passages, said partitions having an offset diametral position relative to each other with the radially outward edge and the radially inward edge of one partition being displaced radially in the same direction relative to the radially outward edge and the radially inward edge of the other partition respectively, so as to direct some of the liquid flowing from the outlet of a passage on one side of one of the partitions into the inlet of a passage on the opposite side of the ther partition, whereby to tend to equalize the liquid velocity front adjacent the inlets and outlets of the passages.

3. In a hydro-kinetic coupler, a rotary impeller member, a rotary runner member, said members being in closely facing co-axial relationship and cooperating to form at least a portion of a rotary torus chamber for hydraulic liquid and each member having blades so that torque may be transmitted from one member to the other, the impeller member having an outer wall and a core defining a flow path, the runner member having an outer wall and a core defining a flow path, partition means in the flow path of the impeller member dividing the flow path into inner and outer flow passages, partition means in the flow path of the runner member dividing the flow path into inner and outer flow passages, the ends of the outer flow passages of the two members being in generally facing relationship, and the ends of the inner flow passages of the two members being generally in facing relationship, said partition means being offset in a diametral manner so that one of the flow passages defined by one partition increases in cross sectional area in the direction of the flow of the liquid and the other flow passage defined thereby decreases in cross sectional area in the direction of flow of the liquid, whereby some of the liquid which flows from the outlet of a passage of increasing cross sectional area is directed into the inlet of a generally non-facing passage defined by the other partition to thereby tend to equalize the velocity front adjacent the ends of the flow passages.

4. In a hydro-kinetic coupler, a rotary impeller member, a rotary runner member, said members being in closely facing co-axial relationship and cooperating to form at least a portion of a rotary torus chamber for hydraulic liquid and each member having blades so that torque may be transmitted from one member to the other, the impeller member having an outer wall and a core defining a flow path, the runner member having an outer wall and a core defining a flow path, and partition means in at least one of the members positioned between the core and the outer wall thereof defining inner and outer flow passages, said partition means being offset in a diametral manner relative to the core and outer wall so that the inner and outer passages defined thereby vary in cross sectional area with one increasing in cross sectional area in the direction of flow of the liquid and the other decreasing in cross sectional area in the direction of flow of the liquid, whereby the liquid flowing through said one passage is decelerated and the liquid flowing through said other passage is accelerated to thereby tend to provide a substantially uniform liquid velocity front across the flow path adjacent the ends of the flow passages.

5. In a hydro-kinetic coupler, a rotary impeller member, a rotary runner member, said members being in closely facing co-axial relationship and cooperating to form at least a portion of a rotary torus chamber for hydraulic liquid and both members having blades so that torque may be transmitted from one member to the other, both members having an outer wall serving to confine the flow of the hydraulic liquid in a flow path, a partition in one of the members for dividing the flow path therein and together with the outer wall of said member defining an outer flow passage, said partition having an offset diametral position relative to the outer wall of said member so that the outer flow passage defined by said partition and by the outer wall has its inlet end and its outlet end of different cross sectional areas with the cross sectional area of said outer flow passage increasing from its end of lesser cross sectional area to its end of greater cross sectional area, whereby the velocity of the liquid passing therethrough is changed to thereby tend to provide a substantially uniform liquid velocity front across the said flow path adjacent the said ends of said outer flow passage.

6. In a hydro-kinetic coupler, a rotary impeller member, a rotary runner member, said members being in closely facing co-axial relationship and cooperating to form at least a portion of a rotary torus chamber for hydraulic liquid and both members having blades so that torque may be transmitted from one member to the other, both members having an outer wall serving to confine the flow of the hydraulic liquid in a flow path, a partition in each of the members for dividing the flow path therein and together with the outer wall of each member defining an outer flow passage in each member, said partitions having an offset diametral position relative to each other so that the outer flow passage defined by one partition and by the outer wall of one member has its inlet end and its outlet end of different cross sectional areas with the cross sectional area of said outer flow passage increasing from its end of lesser cross sectional area to its end of greater cross sectional area, whereby the velocity of the liquid passing therethrough is changed to thereby tend to provide a substantially uniform liquid velocity front across the said flow path adjacent the ends of outer flow passage defined by said one partition.

7. In a hydro-kinetic coupler, a rotary impeller member, a rotary runner member, said members being in closely facing co-axial relationship and cooperating to form at least a portion of a rotary torus chamber for hydraulic liquid, each of said members having walls serving to define a flow path for the hydraulic liquid in each member, with the outlet of the flow path in one member substantially in registry with the inlet of the flow path in the other member, both members having blades so that torque may be transmitted from one member to the other member, partition means in at least one of the members for dividing the flow path therein and defining an inner flow passage and an outer flow passage in said member, said partition means having an offset diametral position relative to the said walls in said one member which define the flow path therein so that the inner flow passage varies in cross sectional area substantially from one end thereof to the other end thereof, whereby the velocity of the liquid passing through said inner flow passage is changed to thereby tend to provide a substantially uniform liquid velocity front across said flow path where the hydraulic liquid in said flow path passes from the flow path in one member into the flow path of the other member.

8. In a hydro-kinetic coupler, a rotary impeller member, a rotary runner member, said members being in closely facing co-axial relationship and cooperating to form at least a portion of a rotary torus chamber for hydraulic liquid, each of said members having walls serving to define a flow path for the hydraulic liquid in each member, with the outlet of the flow path in one member substantially in registry with the inlet of the flow path in the other member, both members having blades so that torque may be transmitted from one member to the other member, partition means in at least one of the members for dividing the flow path therein and defining an inner flow passage and an outer flow passage in said member, said partition means having an offset diametral position relative to the said walls in said one member which define the flow path therein so that the inner flow passage decreases in cross sectional area substantially from one end thereof to the other end thereof in the normal direction of flow of the hydraulic liquid, whereby the velocity of the liquid passing through said inner flow passage is increased to thereby tend to provide a substantially uniform liquid velocity front across said flow path where the hydraulic liquid in said flow path passes from the flow path in one member into the flow path of the other member.

9. In a hydro-kinetic coupler, a rotary impeller member, a rotary runner member, said members being in closely facing co-axial relationship and cooperating to form at least a portion of a rotary torus chamber for hydraulic liquid, each of said members having walls serving to define a flow path in each member for the hydraulic liquid, with the outlet of the flow path in the impeller member substantially in registry with the inlet of the flow path in the runner member, both members having blades so that torque may be transmitted from one member to the other, partition means in the impeller member for dividing the flow path therein and defining an inner flow passage and an outer flow passage, said partition means having an offset diametral position relative to said walls in the impeller member which define the flow path therein, so that the inner flow passage decreases in cross sectional area substantially from one end to the other end in the normal direction of flow of the hydraulic liquid, whereby the velocity of the liquid passing through said inner flow passage in the impeller member is increased, to thereby tend to provide a substantially uniform liquid velocity front across said flow path where the hydraulic medium passes from the outlet of the flow path in the impeller member into the inlet of the flow path in the runner member.

ERNEST E. WEMP.

REFERENCES CITED

The following references are of record in the file of this patent:

UNITED STATES PATENTS

| Number | Name | Date |
| --- | --- | --- |
| 1,904,054 | Kiep et al. | Apr. 18, 1933 |
| 2,061,997 | Dunn | Nov. 24, 1936 |
| 2,074,170 | Dunn | Mar. 16, 1937 |
| 2,429,503 | Zeidler | Oct. 21, 1947 |
| 2,463,582 | Wemp | Mar. 8, 1949 |